United States Patent [19]

Weber

[11] Patent Number: 4,847,934
[45] Date of Patent: Jul. 18, 1989

[54] METHOD OF MANUFACTURING OVERSHOES

[76] Inventor: Robert Weber, 5760 Durocher Avenue, Outremont, Canada, H2V 2Y2

[21] Appl. No.: 137,724

[22] Filed: Dec. 24, 1987

[51] Int. Cl.$^4$ .......................... A43D 97/00; A43B 3/16
[52] U.S. Cl. .................. 12/142 R; 36/7.1 R; 36/7.3; 156/73.3
[58] Field of Search ............ 36/9, 10, 7.1 R, 7.2, 36/7.3; 12/142 R, 142 K; 2/192; 156/73.3, 73.4

[56] References Cited

U.S. PATENT DOCUMENTS

| | | |
|---|---|---|
| 3,402,323 | 9/1968 | Longstreth . |
| 3,634,954 | 1/1972 | Larsen et al. ................ 36/7.3 |
| 3,657,033 | 4/1972 | Sager ..................... 156/73.3 |
| 3,820,484 | 6/1974 | Neill et al. ................ 2/192 X |
| 3,898,750 | 8/1975 | Epstein .................. 36/7.1 R |
| 4,272,859 | 6/1981 | Vanhove ................. 36/7.1 R |
| 4,304,021 | 12/1981 | Theodorsen .............. 12/142 R |
| 4,335,527 | 6/1982 | Pask ..................... 36/7.1 R |
| 4,560,427 | 12/1985 | Flood .................... 156/73.3 |
| 4,598,485 | 7/1986 | Joe et al. ................. 36/7.2 |
| 4,610,042 | 9/1986 | Theodorsen .............. 12/142 R |
| 4,616,428 | 10/1986 | Leger . |
| 4,616,429 | 10/1986 | Alcala .................... 36/7.2 |

FOREIGN PATENT DOCUMENTS

| | | |
|---|---|---|
| 924771 | 4/1973 | Canada . |
| 935993 | 10/1973 | Canada . |
| 1133662 | 10/1982 | Canada . |

*Primary Examiner*—James Kee Chi

[57] ABSTRACT

A method of manufacturing overshoes made from an elongated rectangular flexible sheet of material. The method comprises the following steps: (a) gathering the sheet material by parallel stitching two elastic strips on the opposite side edge portions respectively of the sheet; (b) folding the sheet in two along its longitudinal center line, so as to bring the two gathered side edge portions in respective abutting register; (c) with an ultrasonic press, weakening narrow sections of the sheet transversely to the axis of the longitudinal center line, at regular intervals, and concurrently cross-bonding the sheet along both edge portions defined by each one of the weakened narrow sections of the sheet; and (d) detaching the desired segment of sheet of material along the line of bonding, for any one overshoe. Also, the products obtained by the above-described method.

4 Claims, 2 Drawing Sheets

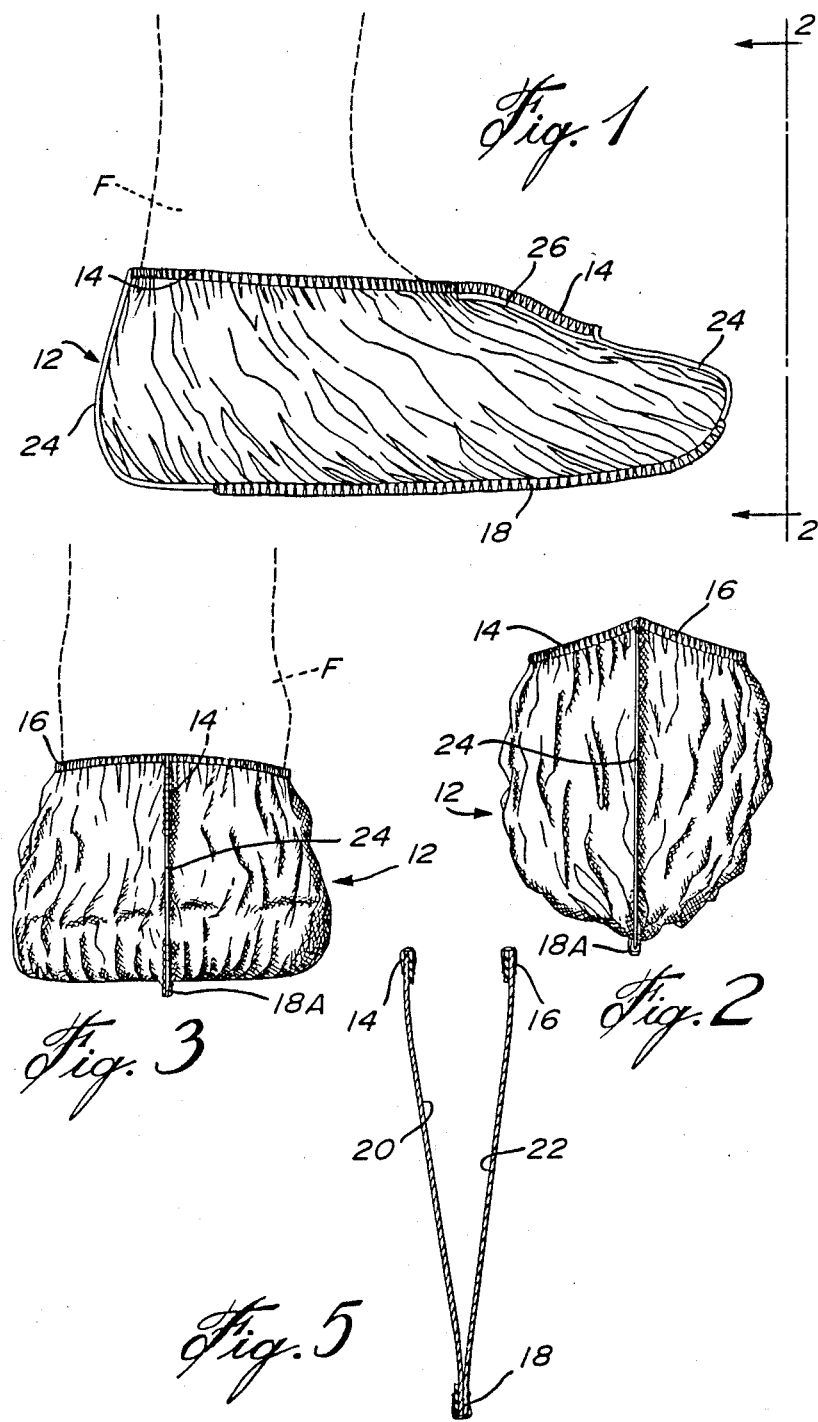

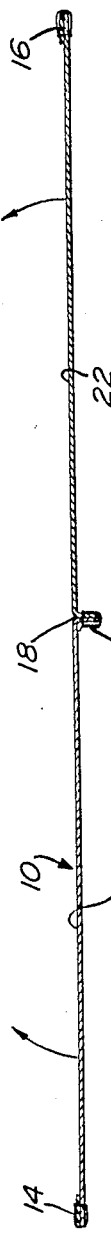
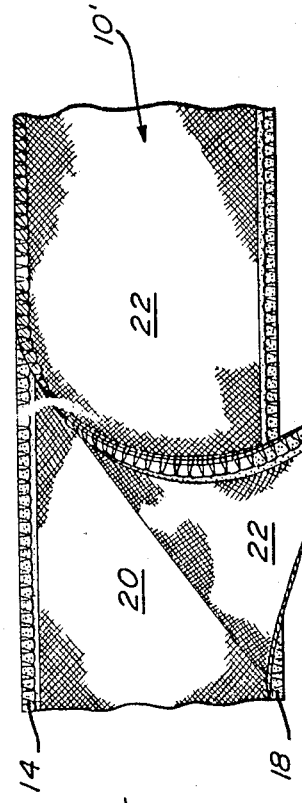
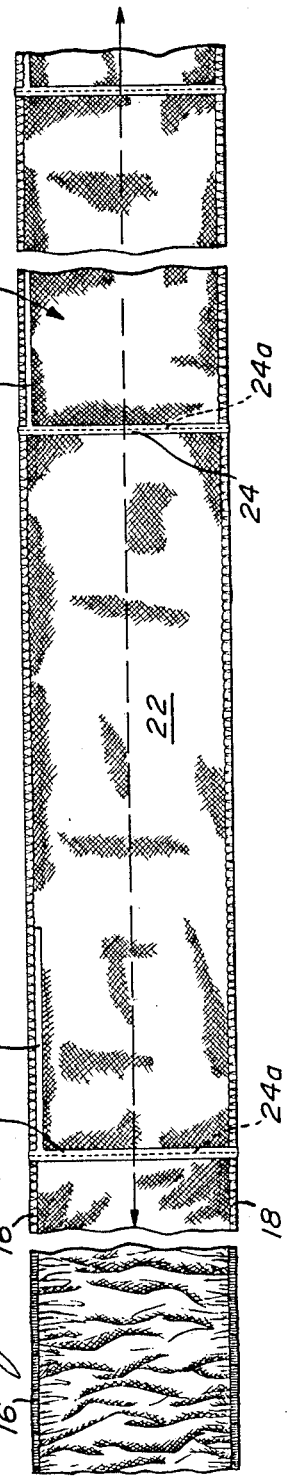

METHOD OF MANUFACTURING OVERSHOES

FIELD OF THE INVENTION

This invention relates to the garment industry, and more specifically to the field of disposable overshoes for workers in hospitals and research laboratories.

BACKGROUND OF THE INVENTION

Hospitals and laboratories are heavy users of disposable-type overshoes, for hygienic reasons mainly. Such articles of clothing should be made in the cheapest way possible, since they are to be used only once, but they should also be well manufactured since their function of protecting against the spread of microbial contaminants is critical.

OBJECTS OF THE INVENTION

The gist of the invention is therefore to provide a method of manufacturing a disposable overshoe, which will entail the lowest possible cost in materials used therefor by almost eliminating losses related to conformation of the article of clothing sheet of material to variations of length of feet or of head size.

An important object of the invention is that the above-mentioned method be fully automated.

Another object of the present invention is that the above-mentioned method provides ease of handling of the overshoe.

A further object of the present invention is that the above-mentioned method provides ease in manufacturing compared to prior art techniques.

Still another object of the present invention is that the above-mentioned method provides ease in dispensing of each article of clothing from a dispenser roll of a plurality of such articles.

SUMMARY OF THE INVENTION

In accordance with the objects of the invention, there is disclosed an article of clothing made from a flexible sheet of material, said sheet being rectangular and having two opposite side edge portions gathered by stitching to first and second parallel elastic strips, respectively; said sheet of material being folded in two along its longitudinal center line, whereby said side edge portions come in register with each other; said article of clothing defining front and rear edge portions; and bonding means, bonding said front and rear edge portions respectively.

Advantageously, there is further included a third narrow intermediate center line portion of the sheet, being gathered by stitching to a third elastic strip.

Also, one of the two said side edge portions thereof is profitably further bonded by said bonding means for a short distance starting from one of said front and rear edge portions of the sheet.

There is further disclosed, additionally to the article of manufacture above-mentioned, a method of manufacturing such article of clothing made from an elongated rectangular flexible sheet of material. The present method comprises the following steps:

(a) gathering the sheet by stitching first and second parallel elastic strips on the opposite side edge portions respectively of said sheet;

(b) folding the sheet along its longitudinal center line to form two flaps and to bring the two gathered side edge portions in respective abutting register;

(c) with a cutting member, weakening narror sections of said sheet flaps transversely to the axis of said longitudinal center line, at regular intervals;

(d) with a bonding member, cross-bonding the sheet flaps at both edge portions defined by each one of said weakened narror sections of the sheet; and (e) manually pulling apart two adjacent segments defined between each pair of successive said transverse weakened sections, outwardly from the common transverse weakened section; wherein an article of clothing is thereby obtained whenever needed by detachment of the desired segment of sheet of material along that common line of bonding.

Preferably, there is further included the following step (aa), to be effected between said steps (a) and (b):

(aa) gathering the sheet by stitching a third elastic strip on a narrow longitudinal intermediate center line portion of said sheet, wherein a downturned flange separating two similar sheet flaps is defined.

Profitably, there is further included the other following step (dd), to be effected between steps (d) and (e):

(dd) with said bonding member, further bonding for a short distance one of the two side edge portions adjacent the weakened narrow transverse section.

Advantageously, there is further included the still further following steps:

(f) rolling said sheet around a reel dispenser; and (g) unrolling said reel dispenser by the length of more than one of said sheet segments, in order to selectively provide one of said articles of clothing whenever needed, by detaching the desired segment of sheet of material along the line of bonding.

It is envisioned that the article of manufacture made in accordance with the present method be an overshoe, and that the cutting member be an ultrasonic press apparatus. In view thereof, the sheet flaps weakening by said cutting member and the flaps bonding by said bonding member would be effected concurrently, i.e. in a single pass. The ultralsonic press apparatus preferably vibrates at a frequency of about 20,000 Hertz. Alternately, said bonding member could consist of a machine having heat sealing means.

It is further envisioned that the constituting material of the article of clothing may be spun-bonded polypropylene, or be constituted inter alia with about 33% of carbon black.

BRIEF DESCRIPTION OF THE DRAWINGS

FIG. 1 is a side elevational view of the foot of a person, the foot being in dotted lines and covered by an overshoe in accordance with a preferred embodiment of the invention;

FIGS. 2 and 3 are front and rear elevational views of the overshoe of FIG. 1; and FIGS. 4 to 7 sequentially show the method of manufacture of the overshoe from an elongated sheet of fabric material, in which:

FIG. 4 is an end view of the fabric sheet, illustrating the two opposite parallel side edge elastic strips and the intermediate elastic strip;

FIG. 5, in the first sheet of drawings, is the view of FIG. 4 but with the two main flaps of the fabric sheet being folded or drawn one toward the other;

FIG. 6, on the second sheet of drawings, is a fragmentary top plan view of the fabric sheet, ready for the bonding and wall weakening operations leading to the production of the overshoe of the invention; and FIG. 7 is a fragmentary broken top plan view of the fabric sheet, during the process of overshoe manufacturing and henceforth suggesting how the latter process is effected.

DETAILED DESCRIPTION OF THE INVENTION

An elongated sheet band 10 of fabric material or other suitable flexible material, is used to manufacture slippers or overshoes 12 according to the invention. Sheet band 10 is originally a flat rectangular sheet of material, the length of which may be a few hundred meters wound around itself. The band or sheet 10 being unwound, three elastic strips 14, 16 and 18 are then parallel stitched while under tension along longitudinal lines at the two opposite side edges and the intermediate section respectively of the band 10. The intermediate elastic strip 18 forms a tissue gathering 18A which is downturned from and extends transversely of the plane of the sheet proper 10. An elongated flap 20 is defined between the sewing lines of elastic strips 14 and 18, and a similar flap 22 is defined between the sewing lines of elastic strips 16 and 18. Flaps 20 and 22 are then brought toward each other by folding the sheet along its center line, see FIGS. 4-5, so as to constitute a double-layered band 10' with elastic strips 14 and 16 registering with each other, see FIG. 6.

Equally spaced apart transverse, bonded sections 24, each with an intermediate weakened line 24a of double layered band 10' are made by a bonding and cutting machine, not shown. More particularly, this machine will have a straight blade member transversely engaging the band 10' at selected equally spaced intervals, to weaken rather than cut the wall of both flaps 20-22 together with weakening the two elastic strips 14-16 as well as intermediate elastic strip 18. Furthermore, this machine will have bonding means which will cross-bond the sheet at boht sides of the weakened transverse line 24a of band 10', and preferably, will also bond together flaps 20, 22 along a short section 26 transverse to and continuing section 24, just inwardly of and parallel to elastic strips 14-16. All sections 26 extend in the same direction. As shown in FIG. 1, elastic bands 14, 16 and 18 gather the fabric around the wearer's shoe to conform to the shape of the latter and bonded section 26 overlies the foot instep to more firmly hold the overshoe in place.

It is envisioned that the band wall weakening and the bonding be effected concurrently thanks to dual-purpose means. This bonding/cutting dual purpose machine will preferably be an ultrasonic-type press. The ultrasonic press apparatus should advantageously vibrate at a frequency of about 20,000 Hertz. Or, bonding could be effected by heat sealing with an appropriate heated blade.

The resulting double layered multiple bonding band 10" can be wound in a reel dispenser. Hence, to detach one overshoe, one needs only to unroll the reel dispenser to bring two transverse band sections 24 outwardly thereof, and to pull apart with two hands one segment 12 of sheet 10 so as to tear the band transversely along a weakened cross line 24a.

The present invention is characterized by the ease of feeding of individual slippers 12, via the reel dispenser in a fashion similar to that of feeding of tissue from toilet tissue rolls; by the ease of handling of the band 10", by the ease of manufacturing of the overshoes 12; by the efficiency of operations, in that there is almost no loss in material since the slipper is not cut according to a predefined pattern to conform to the shape of the foot with which the slippers are to be used as with conventional techniques; and by a low manufacturing cost, in that every operation can be fully automated.

Obviously, it is an extremely simple matter to take into account various lengths of slippers 12 for various lengths of feet F: the operator needs only to increase/decrease the relative spacing of each pair of successive transverse sections 24.

Although not shown in the drawings, it is considered to be well within the reach of a competent but unimiginative worker in this art to modify the overshoe 12 for use as a head cover: in view thereof, no bonding segment 26 need be effected, and moreover, no gathering of the sheet by stitching a third elastic strip 18 on the center line thereof is necessary.

The material of the overshoes 12 preferably consists of spun-bonded polypropylene.

The present overshoe is specifically but not exclusively designed for hospital/microbiological laboratory workers: MD's, PhD's, research assistants, nurses and paramedical staff. In view thereof, the constituting material of the overshoes made in accordance with the teachings of the invention should preferably be electrically conductive, i.e. having the lowest possible electrical resistance, so as to electrically "ground" these overshoes and prevent discharge of static electrically, since such sparks may trigger an explosion in ambient air containg highly volatile substances such as ether. This low resistance material could be made from a resin composition such as polyethylene having about 33% carbon black.

I claim:

1. A method of manufacturing overshoes made from an elongated rectangular flexible sheet of material, comprising the following steps:
   (a) gathering the sheet by stitching first and second parallel elastic strips on the opposite side edge portions respectively of said sheet;
   (aa) gathering the sheet by stitching a third elastic strip on a narrow longitudinal intermediate center line portion of said sheet, wherein a downturned flange separating said two sheet flaps is defined.
   (b) folding the sheet along its longitudinal center line to form two flaps and to bring the two gathered side edge portions in respective abutting register;
   (c) with a cutting member, weakening narrow sections of said sheet flaps tranversely to the axis of said longitudinal center line, at regular intervals;
   (d) with a bonding member, cross-bonding the sheet flaps at both edge portions defined by each one of said weakened narrow sections of the sheet; and
   (e) manually pulling apart two adjacent segments defined between each pair of successive said transverse weakened sections, outwardly from the common transverse weakened section; wherein an overshoe is thereby obtained whenever needed by detachment of the desired segment of sheet of material along that common line of bonding.

2. A method of manufacture as defined in claim 1, further including the following step (dd), to be effected between steps (d) and (e);
   (dd) with said bonding member, further bonding for a short distance one of the two said side edge portions adjacent said weakened narrow transverse section.

3. A method of manufacturing overshoes as defined in claim 1, further including the following steps:
   (f) rolling said sheet around a reel dispenser;

and (g) unrolling said reel dispenser by the length of more than one of said sheet segments, in order to selectively provide one of said overshoes whenever needed, by detachment of the desired segment of sheet of material along the line of bonding.

4. A method of manufacture as defined in claim 1, wherein both said cutting member and said bonding member are embodied in a single ultrasonic press apparatus, and both sheet flaps weakening and bonding operations are effected in a single pass.

* * * * *